Nov. 24, 1970       H. W. STIER       3,541,655
INDEXABLE AND REVERSIBLE CUTTING INSERTS
Filed Dec. 29, 1967       2 Sheets-Sheet 2
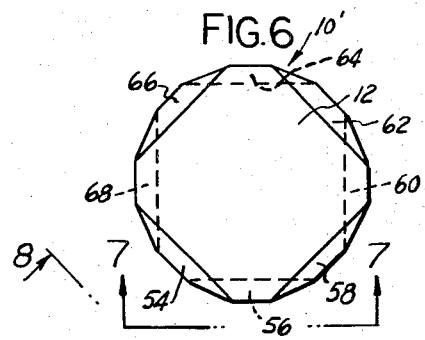
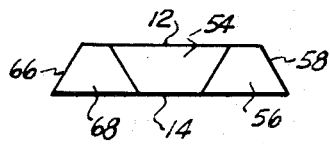
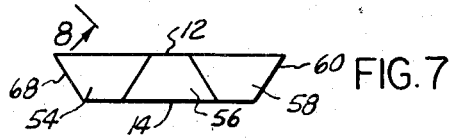
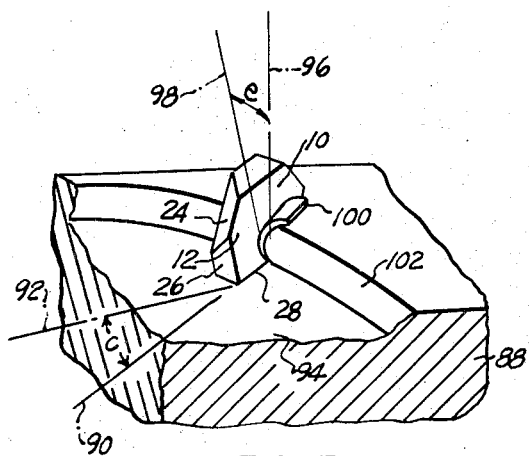
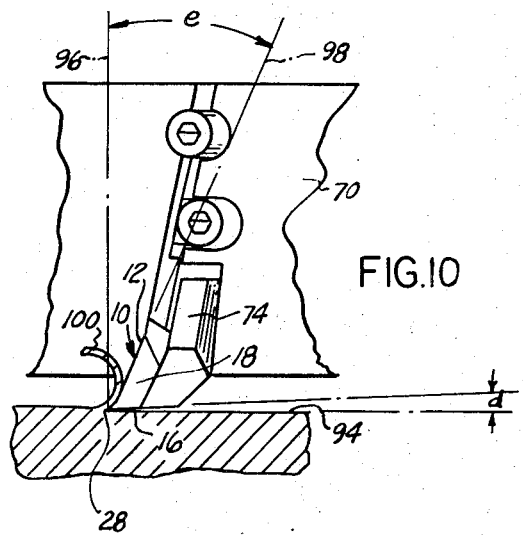
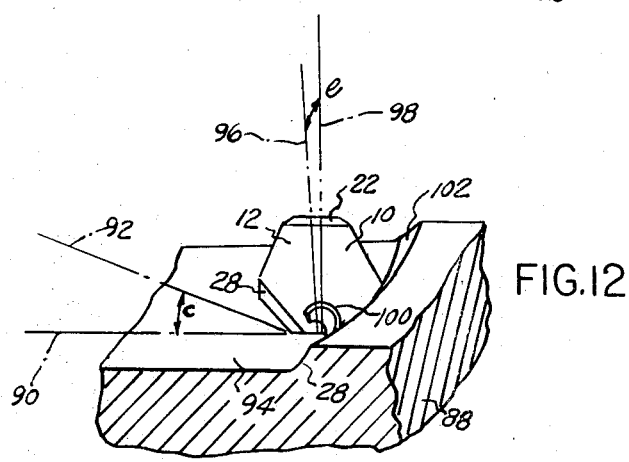
INVENTOR
HENRY W. STIER
ATTORNEYS United States Patent Office 3,541,655
Patented Nov. 24, 1970

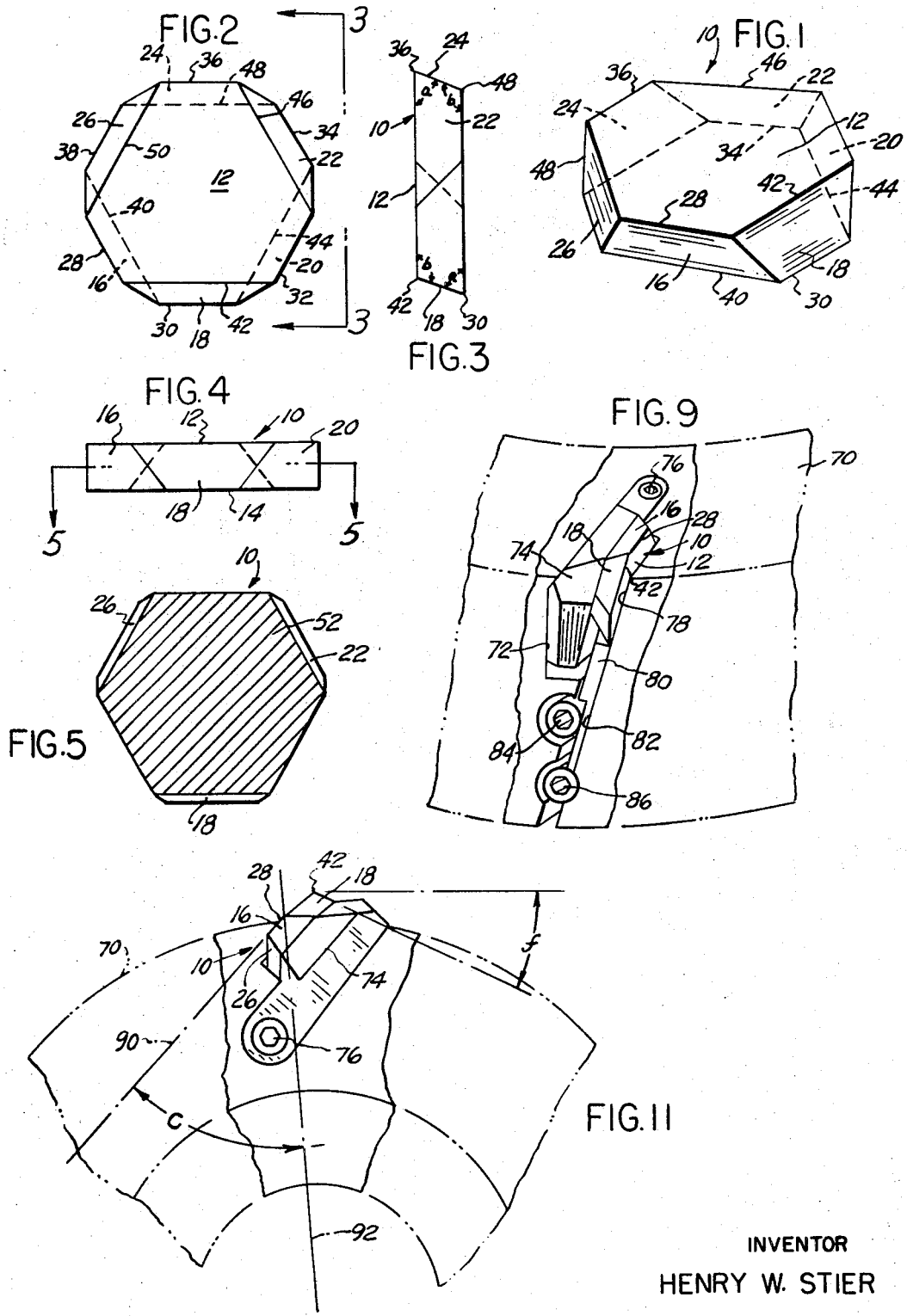

3,541,655
INDEXABLE AND REVERSIBLE CUTTING INSERTS
Henry W. Stier, Dearborn Heights, Mich., assignor to Carmet Company, Pittsburgh, Pa., a corporation of New Jersey
Filed Dec. 29, 1967, Ser. No. 694,678
Int. Cl. B23p 15/28; B26d 1/00
U.S. Cl. 29—95    4 Claims

ABSTRACT OF THE DISCLOSURE

Indexable and reversible cutting inserts for milling cutters and the like and having two polygonal parallel plane faces provided with trapezoidal sides alternately intersecting one face at an acute angle and the other face at a complementary obtuse angle.

BACKGROUND OF THE INVENTION

Replaceable, indexable and reversible cutting inserts made of ultra hard materials such as carbides and the like are commonly used supported in appropriate holders so as to form a cutting tool for cutting a workpiece. In some arrangements, for example in metal turning lathes and the like, a single point cutting insert mounted in an appropriate holder is linearly displaced relatively to a rotating workpiece so as to remove a continuous chip therefrom. In other applications, such as, for example, in a milling operation, a plurality of cutting inserts are disposed in an appropriate manner on a rotating holder adapted to be linearly displaced relatively to a stationary workpiece.

Cutting inserts mounted in such holders so as to form cutting tools are commonly in the shape of a block or plate having a pair of generally polygonal parallel faces interconnected with said faces disposed in planes substantially at right angle to the parallel faces.

SUMMARY OF THE INVENTION

Cutting inserts according to the present invention are made in the form of a plate or prismatic block having parallel faces interconnected by side faces disposed at an angle other than a right angle relatively to the parallel faces. Once disposed in an appropriate holder, such cutting inserts according to the present invention are particularly well adapted for cutting a workpiece by presenting thereto a cutting tip or edge provided with an efficient cutting angle and appropriate rake and clearance angles of the diverse faces of the inserts, with the resulting advantage of improved material removal rate as compared to conventional cutting inserts, decreased tool wear and improved rigidity and strength.

More particularly, cutting inserts according to the present invention have particular importance and present many advantages over conventional cutting inserts when a plurality of identical cutting inserts incorporating the principles of the present invention are mounted in an appropriate manner in a milling cutter or the like, by providing a plurality of appropriately disposed cutting edges and tips permitting a high strength concentration of the material forming each insert behind the cutting edge and tip where it is most desirable for allowing a heavy cut to be taken from the workpiece by each insert without any undue wear or breakage of its cutting edge and tip, and without undue heating of the surface of the workpiece in the process of being machined.

The many advantages and objects of the present invention will become apparent to those skilled in the art when the following description of a few examples thereof as best contemplated to practice the invention is read in conjunction with the accompanying drawings wherein like numerals refer to like or equivalent parts.

BRIEF DESCRIPTION OF THE DRAWINGS

FIG. 1 is a perspective view of an example of a cutting insert according to the present invention;
FIG. 2 is a plan elevation view thereof;
FIG. 3 is a front elevation view thereof from line 3—3 of FIG. 2;
FIG. 4 is a front elevation view from line 4—4 of FIG. 2;
FIG. 5 is a sectional view from line 5—5 of FIG. 4;
FIG. 6 is a plan elevation view of another example of cutting insert according to the present invention;
FIG. 7 is a front elevation view from line 7—7 of FIG. 6;
FIG. 8 is a front elevation view from line 8—8 of FIG. 6;
FIG. 9 is a perspective schematic view of a portion of a milling cutter including cutting inserts according to the present invention;
FIG. 10 is a side elevation view thereof showing a cutting insert in the process of cutting a workpiece;
FIG. 11 is a plan elevation view thereof; and
FIGS. 12 and 13 are schematic perspective views showing a cutting insert according to the present invention in the process of cutting the surface of a workpiece.

DETAILED DESCRIPTION OF THE PREFERRED EMBODIMENTS

As shown in FIGS. 1–5, a cutting insert according to the present invention comprises a block or plate 10 made of ultra hard material such as cemented carbides and the like, provided with two polygonal parallel faces 12 and 14. The cutting insert or plate 10 is shown as having each of its polygonal parallel faces 12 and 14 in the shape of a regular uneven hexagon, and is provided with six equal sides designated 16, 18, 20, 22, 24 and 26 which are disposed relatively to the parallel faces 12 and 14 at angles other than 90°. Sides 18 and 24 are parallel, and sides 20 and 26, and 22 and 16 are also parallel respectively to each other. There are thus defined six acute angle cutting edges 28, 30, 32, 34, 36 and 38, and six obtuse angle cutting edges 40, 42, 44, 46, 48 and 50, each of such acute angles, shown as angle $a$ in FIG. 3, being obviously complementary of each of such obtuse angles, shown as angle $b$. The acute angle $a$ is typically comprised between 90 and 50°, the relationship between the two angles being $a+b=180°$. It can also be seen that an imaginary median plane passing through line 5—5 of FIG. 4 is a regular hexagon, as the regular hexagonal perimeter shown at 52 in FIG. 5.

FIGS. 6–8 show another example of a cutting insert in the form of a plate or block 10' provided with polygonal parallel faces 12 and 14 in the form, in the example shown, of a regular uneven octagon. The octagonal parallel faces are interconnected by eight trapezoidal side faces disposed regularly around the periphery thereof, and forming with the parallel faces 12 and 14 complementary angles other than 90° angles, such side faces being identified in FIG. 6 at 54, 56, 58, 60, 62, 64, 66 and 68.

A plurality of cutting inserts according to the present invention may be disposed to form a milling cutter by being inserted in appropriate pockets on the periphery of the end of a cylindrical body, such as shown at 70 in FIG. 9. Cylindrical body 70 is provided with a plurality of adequately inclined pockets, one of which is shown at 72, each adapted to receive, in a conventional manner, a slidable wedge member 74. The wedge member 74 is drawn in position by a differential screw 76, adapted to draw the wedge member 74 in engagement with a face of a cutting insert 10 for clamping the insert in position between a face of the wedge member and a sidewall 78 of the pocket 72. The bottom side face of the insert is supported by a ledge formed on the upper face of a supporting plate 80 disposed in sliding engagement in a slot 82 formed in the cylindrical body 70 and adapted to be clamped in any appropriate adjusting position by means of an eccentric wedging member 84. The linear position of plate 80 determines the amount of projection of the insert from the pocket and is adjustable by rotation of an adjusting eccentric member 86. Such an arrangement for clamping a plurality of cutting inserts 10 each in a pocket in a cylindrical body to form a milling cutter and for providing axial adjustment of the position of the inserts is well known in the art and is conventional in all respects.

FIGS. 10–13 illustrate in a schematic manner the preferred conditions under which a cutting insert according to the present invention is disposed in a milling cutter for the purpose of providing an arrangement presenting substantial advantages over milling cutters provided with conventional cutting inserts. The cutting insert 10, shown in the shape of the hexagonal cutting insert of FIGS. 1–5, is disposed in the milling cutter cylindrical body 70 so as to cut the surface of a workpiece 88, FIGS. 10 and 12–13, preferably with a negative radial rake $c$. Such radial rake is the angle between an imaginary line 90 representing the orientation of the cutting edge of the insert, for axample, acute cutting edge 28, disposed in engagement with the machined surface 94 of the workpiece 88 and an imaginary line 92 representing a radius of the circle described by the cutting tip of the insert. As shown in FIG. 10, the side face 16 of the insert corresponding to cutting edge 28 forms a clearance angle $d$ with the machined surface 94 of the workpiece. The cutting insert 10 is disposed in its pocket in the cylindrical holder 70 so as to cut the workpiece under an axial rake angle $e$, such axial rake angle being defined as the angle between an imaginary line 96 parallel to the axis of rotation of the cylindrical body 70 and an imaginary line 98 representing the slope of the face 12 of the insert. When the milling cutter body 70 is driven in rotation while being advanced relatively to the surface of the workpiece, each cutting insert is caused to remove from the surface of the workpiece a chip 100 cut from the circular sidewall 102 forming a stepped connection between the machined surface 94 of the workpiece and the original surface of the workpiece. Such cutting of the workpiece sidewall 102 resulting in the removal of chip 100 is actually effected by an obtuse angle cutting edge of each insert such as cutting edge 42, as best seen in FIG. 11.

It will be appreciated that because the cutting angle associated with cutting edge 42 is an obtuse angle the maximum stress applied upon the cutting insert as a result of the cutting insert removing a chip from the workpiece is thus applied upon a cutting edge best designed to withstand such a stress, thereby resulting in long life of the cutting inserts and in a substantial decrease of the wear and tear inflicted thereon. The removal of the chip 100 by the wedging action of the cutting edge 42 is effected with a clearance shown in FIG. 11 by clearance angle $f$ between a tangent to the circular wall surface 102 on the workpiece, and the surface of a side face of the cutting insert such as face 18.

It can thus be seen that cutting inserts according to the geometry of the cutting inserts of the present invention, when disposed in an appropriate holder, provide for a cutting tool arranged to remove material from a workpiece by means of a cutting edge having an effective cutting angle of more than 90°, while still providing adequate clearance between the cutting insert side faces and the machined surfaces of the workpiece, with the accompanying result of substantially improved cutting rate and surface finishes, as compared to cutting tools utilizing conventional inserts. A remarkable result achieved by the present invention is that, under high feed rate and rapid revolution of the cutter, red hot chips are removed from the surface of a workpiece made of carbon steel and the like, while the machined surface of the workpiece remains cool to the touch.

Having thus described the present invention, by way of illustrative examples of typical embodiment thereof, modification whereof will be apparent to those skilled in the art, what is sought to be protected by United States Letters Patent is as follows:

1. An indexable and reversible symmetrical cutting insert suitable for use in milling cutters having two polygonal parallel plane faces equidistant from an imaginary median plane in the form of a regular polygon having an even number of sides at least equal to six, and at least six substantially equal regular trapezoidal side surfaces, each connecting each of the sides of one of said parallel faces with one of the sides of the other of said parallel faces and every other of said side surfaces forming with one of said parallel faces a cutting edge of less than ninety degrees and with the other of the said parallel faces a complementary cutting edge of more than ninety degrees and said adjacent cutting edges in a single plane face intersecting at an angle of greater than 90°.

2. An indexable and reversible symmetrical cutting insert for removable mounting in an appropriate pocket in a milling cutter body, said cutting insert having two polygonal substantially parallel plane faces each provided with a first group of equal short sides and a second group of equal long sides disposed such that every pair of consecutive sides of a face consists of a short side and a long side, each long side of a face being parallel to a short side of the other face and forming therewith a trapezoidal lateral surface at an angle to the parallel plane faces such that an acute angle cutting edge is defined at each short side and a complementary obtuse angle cutting edge is defined at each long side. Said parallel plane faces equidistant from an imaginary median plane, intersected by said trapezoidal lateral surfaces and describing a regular polygon at the intersection.

3. The cutting insert of claim 2 wherein said polygonal plane faces are hexagonal.

4. The cutting insert of claim 2 wherein said polygonal plane faces are octagonal.

References Cited
UNITED STATES PATENTS

| 3,137,918 | 6/1964 | Breuning | 29—96 |
| 3,271,842 | 9/1966 | Breuning | 29—96 |
| 3,289,271 | 12/1966 | Stier | 29—95 |

HARRISON L. HINSON, Primary Examiner

U.S. Cl. X.R.

29—105